United States Patent
Ponsioen

(10) Patent No.: US 6,175,486 B1
(45) Date of Patent: Jan. 16, 2001

(54) SWITCH GEAR FOR MEDIUM VOLTAGE WITH SEPARATELY CONNECTABLE MULTIPLE PHASES

(75) Inventor: Ijsbrand Paulos Johannes Maria Ponsioen, Alphen Aan Den Rijn (NL)

(73) Assignee: Elin Holec High Voltage B.V., Amersfoort (NL)

(*) Notice: Under 35 U.S.C. 154(b), the term of this patent shall be extended for 0 days.

(21) Appl. No.: 09/306,808

(22) Filed: May 7, 1999

(51) Int. Cl.[7] .......................... H01H 33/02; H02B 1/00; H02B 7/00
(52) U.S. Cl. .............. 361/605; 218/43; 218/44; 218/152; 361/611; 361/624; 361/637; 361/648
(58) Field of Search .............. 218/43–88, 152; 361/602–625, 637, 648

(56) References Cited

U.S. PATENT DOCUMENTS

| | | | |
|---|---|---|---|
| 3,823,346 | * 7/1974 | Olsen | 361/612 |
| 3,932,720 | * 1/1976 | Gaigg et al. | 218/43 |
| 4,241,379 | * 12/1980 | Olsen | 218/55 X |
| 4,262,323 | * 4/1981 | Yoshida | 361/604 |
| 4,644,442 | * 2/1987 | Ponsioen et al. | 200/48 R |
| 4,837,662 | * 6/1989 | Takeuchi et al. | 361/618 |
| 5,003,427 | 3/1991 | Reichl et al. | 361/612 |
| 5,166,860 | * 11/1992 | Ponsioen et al. | 361/611 |
| 5,231,247 | * 7/1993 | Paul et al. | 361/602 |
| 5,796,060 | * 8/1998 | Fuchsle et al. | 218/79 |

FOREIGN PATENT DOCUMENTS

| | | |
|---|---|---|
| 26 59 038 | 7/1978 | (DE) . |
| 43 12 620 | 10/1994 | (DE) . |
| 196 13 750 | 10/1997 | (DE) . |
| 0 221 603 | 5/1987 | (EP) . |
| 0 428 220 | 5/1991 | (EP) . |
| 0 459 593 | 12/1991 | (EP) . |
| 915545 | * 11/1998 | (EP) . |
| 585788 | 2/1947 | (GB) . |

* cited by examiner

Primary Examiner—J. R. Scott
(74) Attorney, Agent, or Firm—Young & Thompson

(57) ABSTRACT

The invention relates to switch gear comprising at least one group of n power switches (4), which extend substantially in a longitudinal direction perpendicular to the front of the switch gear, at least one busbar compartment (13,13') containing n busbars (14,14') for each group of n power switches (4), which busbars (14,14') are positioned parallel to the front, wherein each busbar compartment (13,13') is enclosed by at least four walls, two of which are perpendicular to the front, at least one group of n busbar disconnecters (3,3'), for making and breaking contact between busbars (14,14') and respective output terminals (21) of the power switches (4), wherein the output terminals of the power switches (4) are constructed as coupling elements (21), to each of which a linkage (24) is connected and a further linkage (24') can be connected in an opposing direction perpendicular to the longitudinal direction, wherein the n busbars (14,14') extend along one of the walls perpendicular to the front. Connection between busbars and corresponding output terminals is achieved through front and rear switch blades disposed on a rotatable drive rod. In a contact position, the front switch blade contacts the output terminal through the linkage, and the rear switch blade contacts the busbar. When the rotatable drive rod is rotated out of this position, contact is broken.

11 Claims, 6 Drawing Sheets

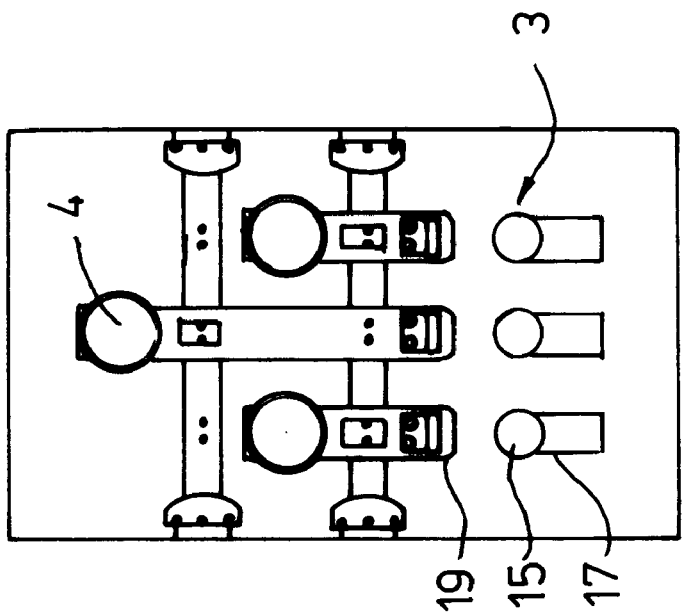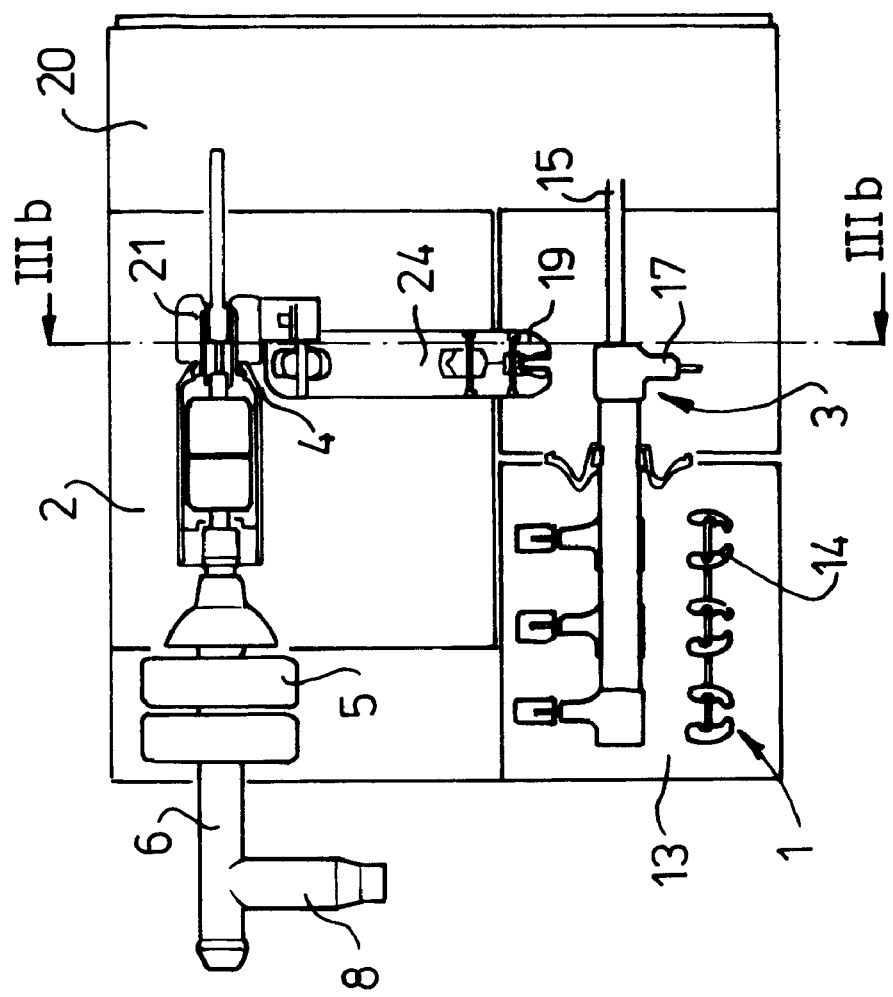

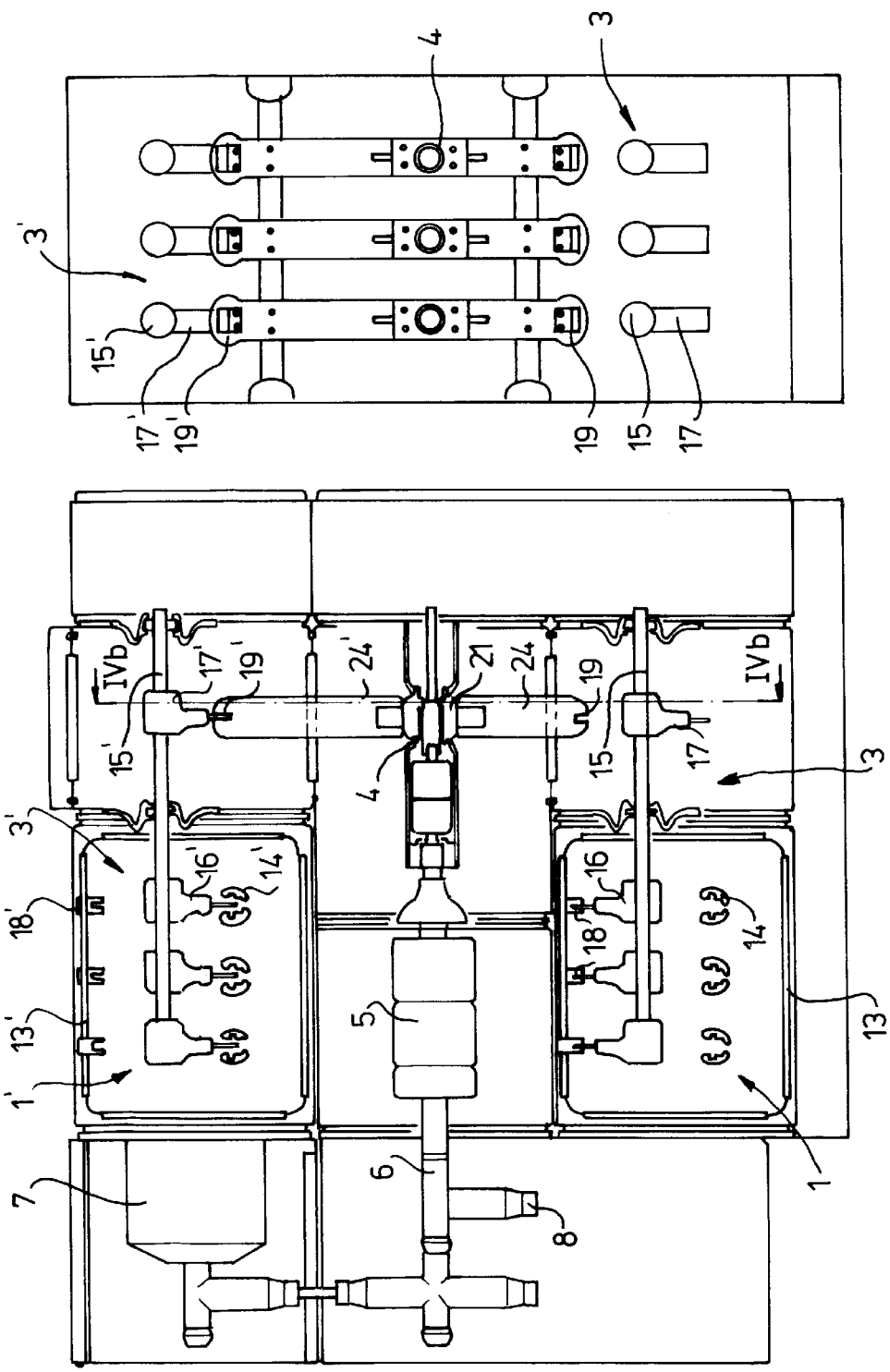

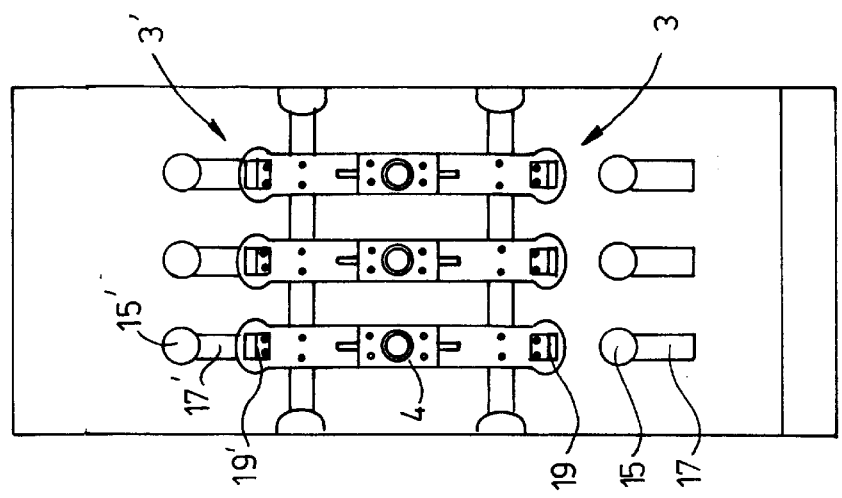
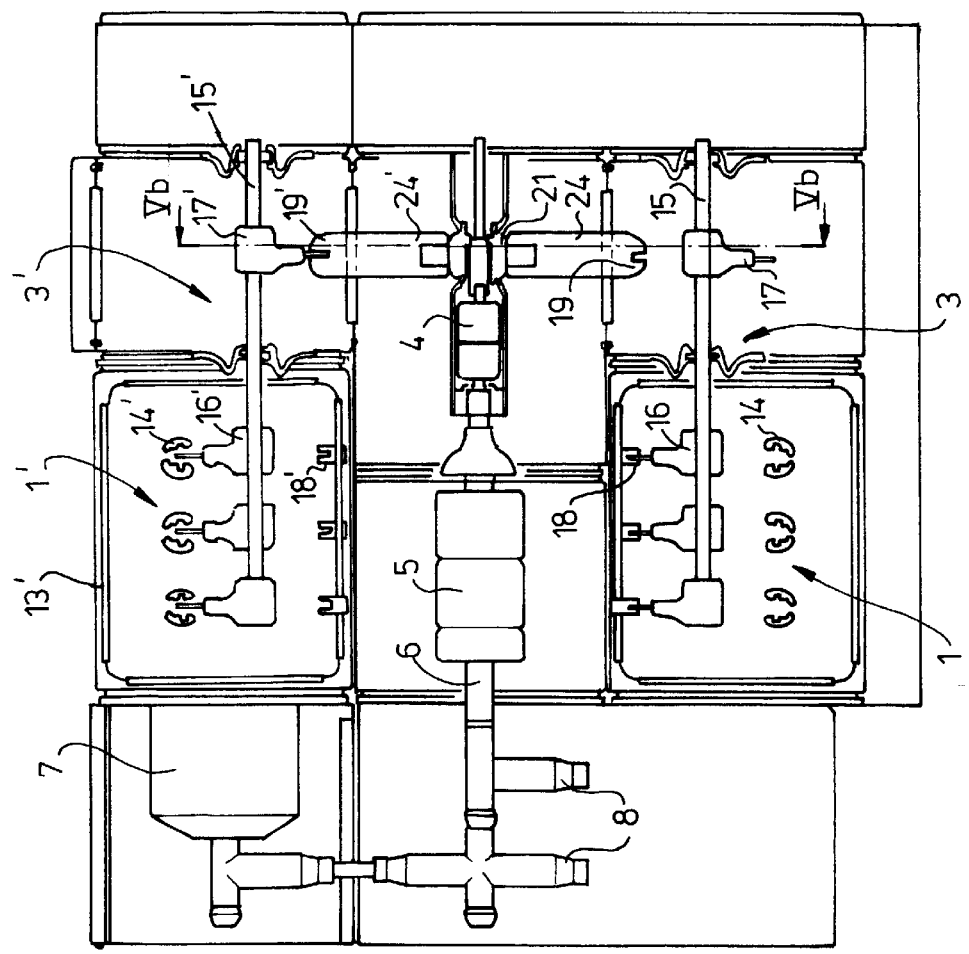

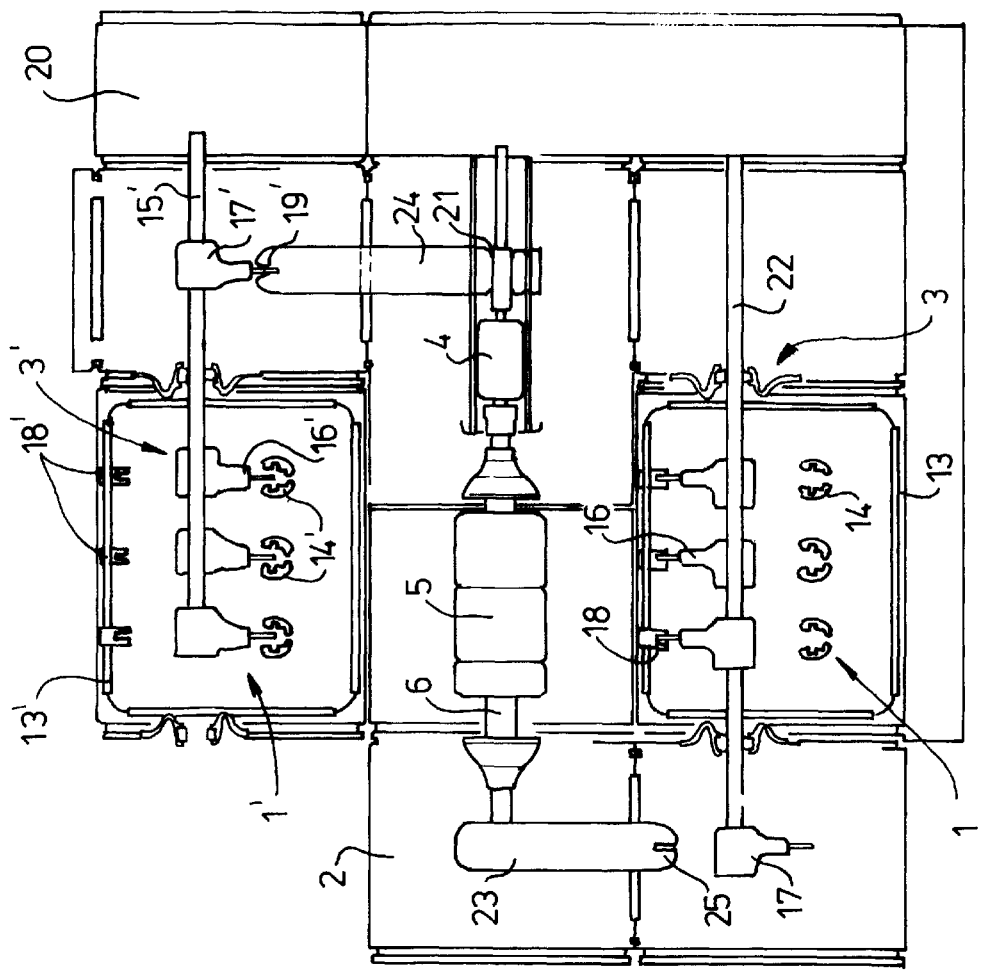

SWITCH GEAR FOR MEDIUM VOLTAGE WITH SEPARATELY CONNECTABLE MULTIPLE PHASES

BACKGROUND OF THE INVENTION

1. Field of the Invention

The invention relates to switch gear having a front and a back, comprising at least one group of n power switches, n being an integer $\geq 2$, each of which have their own input connection and their own output terminal and extend substantially in a longitudinal direction perpendicular to the front of the switch gear, at least one busbar compartment containing n busbars for each group of n power switches, which busbars extend parallel to said front, wherein each busbar compartment is enclosed by at least four walls, two of which are parallel to the front and two of which are perpendicular to the front, at least one group of n busbar disconnecters for each busbar compartment, for making and breaking contact between busbars and respective output terminals of the power switches, wherein the output terminals of the power switches are constructed as coupling elements, to each of which one linkage (24) is connected and a further linkage (24') can be connected in an opposing direction perpendicular to the longitudinal direction, wherein each linkage forms a connection between one of the power switches and one of the busbar disconnecters.

2. Description of the Related Art

Switch gear installations are in general use and are disclosed, for example, in German laid open application DE 28 20 927, in the name of Siemens AG, which describes switch gear provided with at least one partition and a boiler mounted in a recess in the partition, in which boiler a bushing circuit breaker is mounted which has at least one breaker arm, rotatable about an axis located between the two ends of the breaker arm. Switching elements located opposite one another and at least one ground switching element, positioned such that the switching elements can be connected to each other by the breaker arm or that the breaker arm can be connected to the ground switching element, are also present in the boiler. The said laid open application also discloses a further development having a second boiler with switching elements, as a result of which a switch gear installation is formed which is able to switch a three-phase busbar system with a three-phase feed cable. An embodiment is also shown in which two busbar systems with a feed cable can be switched. The disadvantage of the said installation is that the switch gear for a busbar system is not of modular construction and, therefore, expansion to a dual busbar system is not simple to implement and demands additional space. Because of the required modifications to an existing single busbar system, it is necessary for the entire installation to be shut down for the expansion in order to be able to work safely on the installation. Furthermore, the control elements are not all placed on one side of the installation, which has an adverse effect on the clarity of the layout and the accessibility of the installation.

Another switch gear installation is disclosed in German laid open application DE 33 30 550, in the name of Sprecher & Schuh AG, which shows an installation which comprises two busbar systems mounted in a casing, which busbar systems are connected to a branch via busbar disconnecters provided with integral ground switches. The branch consists of a power switch connected to a cable connector. The connection between the branch and the ground switches of the two busbar systems is made by two switch-over elements, which are rotatable about an axis. The switching elements can be connected to the power switch via a conductor or to a ground point. By this means it is possible to ground a busbar system, as a result of which work on the busbar system outside the switch gear can be carried out. A disadvantage is that for work on parts of a busbar system inside the switch gear, such as expansion of a single busbar system to a dual busbar system, the entire installation has to be shut down. The construction of the installation is such that the installation takes up an appreciable amount of space. Furthermore, because of the positioning of the various parts and control elements the clarity of the layout and the accessibility for work to be carried out is not optimum.

Switch gear of the type defined in the preamble is disclosed in European Patent EP-A 0 459 593 as switch gear for the low medium voltage range, also known as the modular medium voltage switching system (MMS) from Holec Holland. This installation is of the same type as that defined in the preamble, but is suitable only for applications up to 24 kV. The said installation comprises medium voltage switches (one for each phase) with coupling elements perpendicular thereto, to which coupling elements busbar disconnecters are connected which are able to make or break a connection to a busbar system. The MMS installation can be expanded in modular fashion (on the top or the bottom) with a second busbar system and associated busbar disconnecters.

Furthermore, the L-SEP switch gear from Elin Holec High Voltage BV, which has been designed for operation at 50 kV and above, is known as switch gear for the high voltage range. The L-SEP switch gear, as disclosed in EP-B 0 221 603, comprises a number of compartments filled with $SF_6$ gas. With this switch gear the primary three-phase power is fed in or taken off at the rear in a so-called cable terminal compartment by means of cable connectors. The cable connectors are connected via dual make-and-break contact breakers (one per phase) to the high voltage switches (likewise one per phase) in a switch compartment that is located physically before the cable terminal compartment. The high voltage switches are operated by a drive mechanism that is located on the front of the switch gear. The high voltage switches are connected to busbar disconnecters (one per phase) with dual make-and-break elements. The said busbar disconnecters with dual make-and-break elements improve safety during maintenance work. 3-phase busbar systems run from the busbar disconnecters, horizontally and parallel to the front of the installation. Said busbar systems connect the various switch gear installations. In the L-SEP switch gear the busbar compartment is frequently of dual construction in order, for example, to be able to put a second busbar system into service if the first busbar system has to be taken out of service because of testing or maintenance work. The two busbar compartments are located physically above the switch compartment, the drive mechanisms for the busbar disconnecters being positioned on the top of the switch gear.

In the case of the L-SEP installation, as a consequence of the dimensions that are needed for the voltage to be switched by this installation, the controls for the power switches are located on the front of the switch gear and those for the busbar disconnecters on the top of the switch gear.

SUMMARY OF THE INVENTION

The object of the present invention is to provide switch gear of the type described in the preamble, which, in particular, is suitable for operation at medium voltages (10–50 kV) and also has advantages in respect of space requirement, manufacture and operation.

This object is achieved with switch gear of the type described in the preamble, characterised in that the n busbars extend along one of the walls perpendicular to the front. In a preferred embodiment the busbars are positioned in parallel and all busbars are located the same distance away from the one of the walls perpendicular to the front.

Although the invention is concentrated on operation at medium voltage in this description, a similar construction can be used for switch gear for operation at both lower and higher voltages.

According to one embodiment of the invention, the connections between the power switch and the feed conductor and between linkages and the coupling elements are constructed in the form of sliding contacts. As a result it is possible to remove the power switch and the coupling element from the installation as a single unit, without further dismantling activities having to be carried out.

In relative terms, less space is required with the construction of the switch gear according to the invention. As a result of the compact construction and the orientation of the various components, the dimensions of the switch gear according to the invention will be smaller than those of the installations disclosed in DE 29 20 927 and DE 33 30 550. The installation will also be smaller than an MMS installation that has been scaled up for operation at 36 kV. This is because in the MMS installation the busbars are located along the rear wall, which is positioned parallel to the front, as a result of which the busbar disconnecters have to be arranged at an angle, with associated loss of space. As a result of the arrangement of the busbars according to the invention, the busbar compartments can be of relatively smaller construction.

Customers are increasingly asking for smaller dimensions. As a result of the orientation of the various components, in particular the said n busbars, and the modular construction of the switch gear, the latter is very compact and consequently easier to install in a building.

Furthermore, the switch gear according to the invention is of modular construction. Components are interchangeable between different switch gear installations and parts thereof and the compartments are simple to stack.

According to a further embodiment of the invention, the busbar disconnecters are constructed as disconnecters with dual make-and-break elements. The arrangement of the busbars in the busbar compartments according to the invention makes it possible to use disconnecters with dual make-and-break elements. Their construction does not have to be modified to enable them to be used in the modular concept of the invention. As a result of the construction of said disconnecters with dual make-and-break elements, the current will always be discharged to ground in the event of a fault occurring in the installation which causes an electric arc to be produced which impinges on an opened busbar disconnecter and the disconnected busbar systems can never become live.

As a result of the use of the disconnecter with dual make-and-break elements, the installation can be expanded with additional switch gear during operation. It is also possible to install a second busbar compartment, with the exception of the fitting of the linkages between the power switches and the busbar disconnecters, without having to shut down the switch gear. The time for which the switch gear has to be shut down for expansion and/or maintenance work is appreciably shortened as a result.

As a result of the use of the disconnecter with dual make-and-break elements, it is possible, in the case of the use of two busbar compartments in one embodiment of the invention, to safely disconnect one busbar system for, for example, testing or maintenance work, the second busbar system being put into service at the same time.

An additional advantage of the modular addition of the second busbar compartment on top of the switch gear is that the use of floor area remains the same. In other words, no space has to be reserved for the second busbar compartment in the horizontal plane (seen during operation).

In other words, the invention combines the advantages offered by the MMS system and the L-SEP system, in particular with regard to accessibility, controls, drive at the front, modularity, safety and the possibility of maintenance, testing and expansion during operation.

In a further embodiment of the invention the switch gear is used as a coupling installation for two busbar systems. This is possible because of the modular construction of the switch gear, which has already been mentioned above. By incorporating such a coupling installation in a series of switching and coupling installations it is possible to form a complex switching station having several medium voltage connection points and busbar systems, without additional, differently shaped, compartments being required.

According to a preferred embodiment of the invention, all controls are located on the front of the switch gear. This is also important for safety, since the compartment housing the controls constitutes an extra strong barrier in the event of a sudden rise in pressure in the switch gear. Furthermore, all measurement and indication means are located on the front of the switch gear according to the invention, which gives rise to fewer EMC problems.

A further embodiment of the invention in which use is made of $SF_6$ insulation can be of even more compact construction, as a result of which the switch gear takes up less space.

Even more space is saved in a further embodiment of the invention in which the installation is provided with $SF_6$ gas insulation, n=3 and, in the at least one group of three power switches, viewed in the said longitudinal direction, the three power switches are arranged in the shape of a triangle.

In a further embodiment of the invention a voltage transformer is added, which transforms the medium voltage supplied by the power cables to a working voltage for the measurement and indication means.

In a preferred embodiment of the invention the current transformer is mounted on the feed conductor in the switch compartment. As a result the current transformer is easily accessible for testing and maintenance work without it being necessary to take out the power switch.

In a further embodiment a grounding contact is located on the front of the installation according to the invention, which grounds the installation at the location of the linkages between the power switch and the busbar disconnecter. The linkages are provided with ground capture contacts for this purpose. This facility for grounding offers advantages with regard to safety for installation and maintenance work.

BRIEF DESCRIPTION OF THE DRAWINGS

The switch gear according to the invention will be explained in more detail below with reference to the figures and the various preferred embodiments.

FIG. 2b shows a section along the line IIb—IIb in FIG. 2a.

FIG. 3a shows a longitudinal section of the switch gear according to the invention with SF$_6$ gas insulation.

FIG. 3b shows a section along the line IIIb—IIIb in FIG. 3a.

FIG. 4a shows a longitudinal section of the switch gear according to the invention with air insulation and dual busbar system.

FIG. 4b shows a section along the line IVb—IVb in FIG. 4a.

FIG. 5a shows the embodiment of the invention from FIG. 4a with mirror image symmetry.

FIG. 5b shows a section along the line Vb—Vb in FIG. 5a.

FIG. 6 shows a further embodiment of the invention in which the switch gear is used as a coupling installation for two busbar systems.

DESCRIPTION OF THE PREFERRED EMBODIMENTS

Figure 1A:
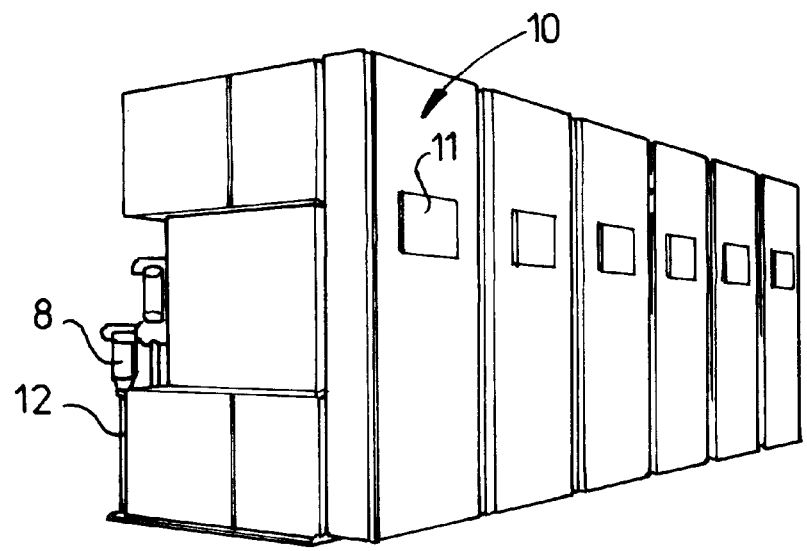
FIG. 1a shows a perspective view of the front of a number of switch gear installations positioned alongside one another.

In the various figures the same reference numerals refer to the same components.

Figure 1B:
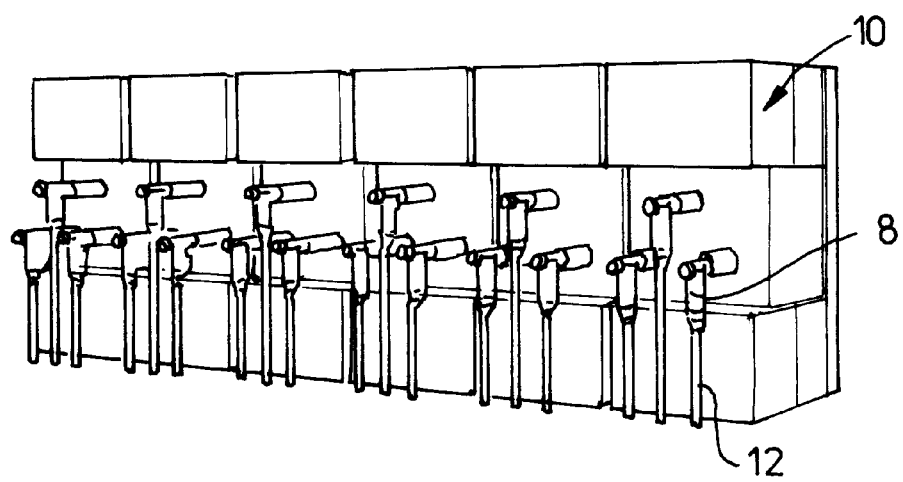
FIG. 1b shows a perspective view of the rear of a number of switch gear installations positioned alongside one another.

FIG. 1a shows a perspective front view of a number of switch gear installations 10 with control panels 11 according to the invention, placed alongside one another. This figure shows power cables 12 running vertically, which cables are connected to the switch gear by means of cable plugs 8. FIG. 1b shows the rear of the arrangement shown in FIG. 1a.

Figure 2B:
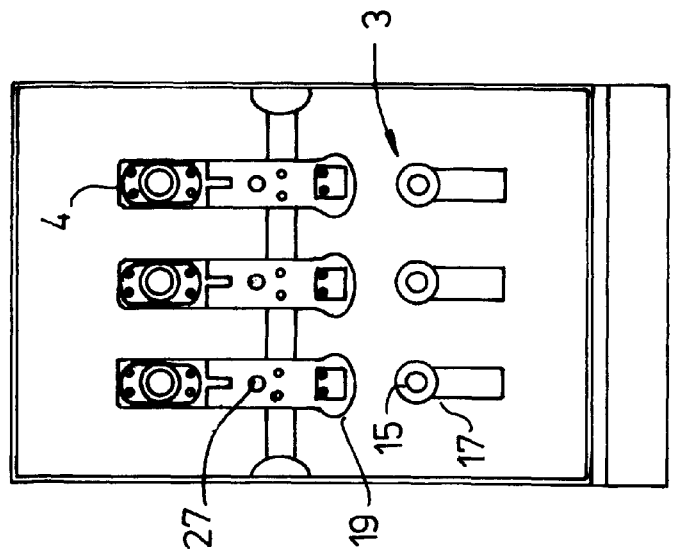
Figure 2A:
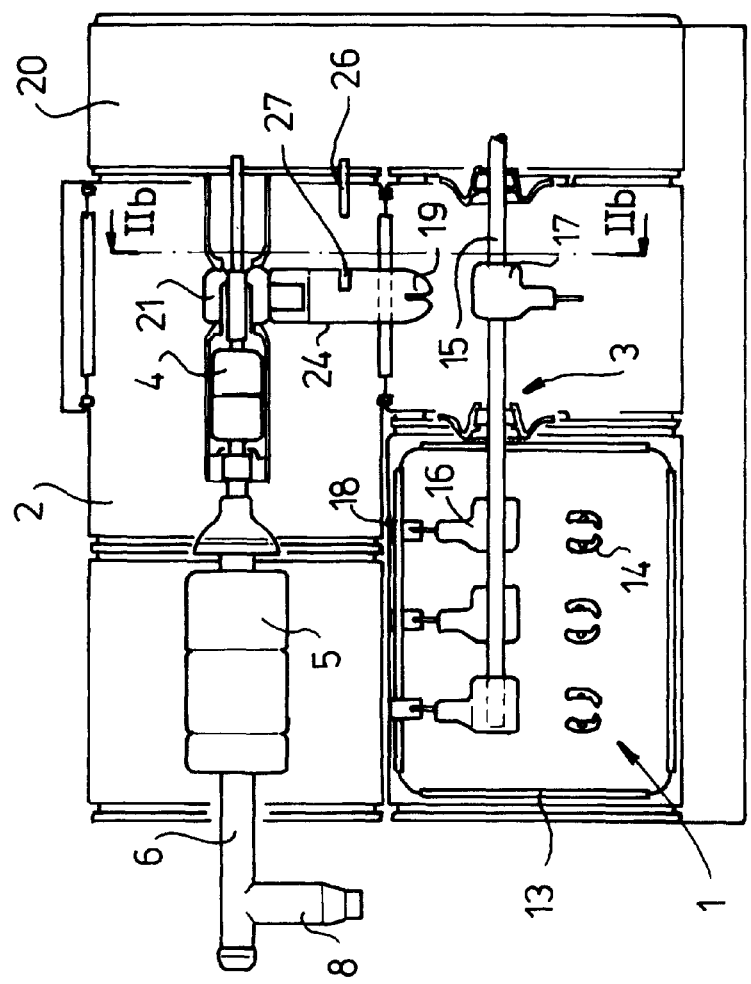
FIG. 2a shows a longitudinal section of the switch gear according to the invention with air insulation.

FIGS. 2a and 2b show sections of the preferred embodiment of the invention with air insulation. FIG. 2a shows a longitudinal section of the switch gear and FIG. 2b shows a section along the line IIb—IIb in FIG. 2a. The dimensions are relatively small, the length of the switch gear according to this embodiment is 2,000 mm, the height 1,675 mm and the width 1,000 mm. A 3-phase busbar system 1, which comprises three busbars 14 running horizontally over the width of the switch gear and positioned perpendicular to the longitudinal direction thereof, is located in a busbar compartment 13. The switch compartment 2, in which a feed conductor 6, which also serves as connection point for a cable plug 8, a power switch 4 and a connecting conductor 21 are located, with three of each (one per phase), is located above the busbar compartment 13. A drive cabinet 20, in which the drive mechanisms (not shown) with electronics and any measurement electronics are located, is located on the front. There are three cable plugs 8, one of which is visible in FIG. 2a, on the rear of the switch gear. In this air insulation embodiment, the combinations of cable plug 8, feed conductor 6, current transformer 5, power switch 4 and connecting conductor 21 per phase are at the same height (see FIG. 2b). The control elements for all busbar disconnecters 3 and medium voltage power switches 4 are located on the front of the switch gear. Each busbar disconnecter 3 comprises a rotatable drive rod 15, consisting of an insulator part and a conductor part, which has a front switch blade 17 and a rear switch blade 16. FIG. 2a shows the situation where the front switch blade 17 is not in contact with a bottom contact point 19 of the power switch 4 and the rear switch blade 16 is connected to a ground contact 18. As a result of this construction, voltage will never be able to be applied to one of the busbars 14 in the event of a spark arcing between contact point 19 and busbar disconnecter 3. Busbar disconnecters 3 of this type are known and are referred to as disconnecters with dual make-and-break elements.

The drive (not shown) for the rod 15 is able to cause this to rotate through 180°, after which the switch blade 17 is in contact with contact point 19 and switch blade 16 is in contact with one of the busbars 14.

A connecting conductor, which is constructed as a coupling element 21, is located on the front of the power switch 4. A conductor 24, which is preferably detachable, can be connected to the coupling element 21. The conductor 24 has a contact point 19 at the end. The conductor 24 is fixed such that in one particular position of the busbar disconnecter 3 the front switch blade 17 is in contact with contact point 19.

The connections between the power switch 4 and the feed conductor 6 and between the conductor 24 and the coupling element 21 are preferably constructed as sliding contacts. As a result it is possible to remove the combination of power switch 4 and the coupling element 21 from the installation as a single unit, without further dismantling activities being required.

Finally, it is shown in FIGS. 2a and 2b that the installation can be provided with a ground contact 26 on the front of the installation, the ground contact 26 grounding the installation at the location of the conductor 24 between the power switch 4 and the busbar disconnecter 3. The conductors 24 are provided with ground capture contacts 27 for this purpose. This facility for grounding offers advantages with regard to safety during assembly and maintenance work. This facility can be employed in all embodiments of the invention, as discussed below. For the sake of clarity, however, the ground contacts and ground capture contacts are not shown in FIGS. 3 to 6.

FIGS. 3a and 3b show two sections of the preferred embodiment of the invention with SF$_6$ gas insulation. FIG. 3a shows a longitudinal section of the switch gear and FIG. 3b shows a section along the line IIIb—IIIb in FIG. 3a. As a result of the SF$_6$ gas insulation and the consequently possible triangular arrangement of the combinations of cable plug 8, connecting connector 6, current transformer 5 and power switch 4, the dimensions are even smaller than those of the embodiment with air insulation. The length of the switch gear according to this embodiment is 1,500 mm, the height 1,300 mm and the width 800 mm.

FIGS. 4a and 4b show two sections of the preferred embodiment of the invention with air insulation and dual busbar system. FIG. 4a shows a longitudinal section of the switch gear and FIG. 4b shows a section along the line IVb—IVb in FIG. 4a. This embodiment has a second busbar compartment 13' added to the top of the switch gear. In FIGS. 4a and 4b elements in busbar compartments 13' similar to those busbar compartment 13 are given the same reference numerals with a prime. In accordance with the invention the coupling element 21 is so constructed that tubes 24, 24' can be connected to either side thereof, so that tubes 24, 24' form a T-shaped construction with the output of the power switch 4, as a result of which symmetry of the arrangement with respect to a plane through the installation can be achieved. Moreover, the two drive rods 15, 15' which operate the busbar disconnecters 3, 3' can extend as far as the front of the installation, which facilitates operation and maintenance. In the switch gear shown in FIG. 4a, the top busbar system 1' is connected to the power cables 12 and the bottom busbar system 1 is not connected to said cables. FIG. 4a also shows an added voltage transformer 7, which transforms the medium voltage supplied by the power cables 12 to measurement voltage for the control elements in the drive cabinet 20 on the front of the switch gear.

FIG. 4a shows the situations where the ground contacts 18' are located at the top, just as in busbar compartment 13.

However, this is not a requirement in principle. As shown in FIGS. 5a and 5b it is also possible to position these contacts at the bottom (and the busbars 14' above the rod 15'), so that the entire arrangement of busbar compartments 13, 13' is symmetrical with respect to a horizontal plane through the switch gear.

FIG. 6 shows a further embodiment of the invention in which the switch gear 10 is used as a switchable coupling installation for two busbar systems 1, 1'. In this case the cable plugs 8 on the rear of the switch gear are removed. The lower busbar compartment 13 is fitted the other way around in the longitudinal direction, an extension shaft 22 being added, as a result of which operation of the disconnecter with dual make-and-break elements 3 remains possible from the front of the switch gear 10. The connecting conductor 6 in the switch compartment 2 is extended to the rear of the switch gear 10 and a conductor 23, with a contact point 25, is added. In the situation shown in FIG. 6, the busbars 14' of the upper busbar system 1' are connected to the power switches 4 by means of the rear switch blades 16' and the front switch blades 17' of the disconnecter with dual make-and-break elements 3', contact points 19' and coupling elements 21. Because switch blades 17 of the lower disconnecters with dual make-and-break elements 3 are not connected to the contact point 25 of the coupling elements 23, the lower disconnecters with dual make-and-break elements 3 are connected by means of the switch blades 16 to the ground points 18 of the lower switch compartment 13.

Of course, other variants, with a different modular construction and other, more complex switching diagrams, are possible according to the present invention.

What is claimed is:

1. Switch gear having a front and a back, comprising:
   at least one group of n power switches (4), n being an integer ≧2, each of the power switches (4) having a separate feed conductor (6) and output terminal (21) extending substantially in a longitudinal direction perpendicular to the front of the switch gear (10),
   at least one busbar compartment (13,13') containing a busbar (14,14') for each of said n power switches (4), said busbars extending parallel to said front, wherein each busbar compartment (13,13') is enclosed by at least four walls, two of which are parallel to the front and two of which are perpendicular to the front,
   at least one group of n busbar disconnecters (3,3') for each said busbar compartment (13,13'), for making and breaking contact between the busbars (14,14') and respective said output terminals (21) of the power switches (4),
   wherein the output terminals (21) of the power switches (4) are constructed as coupling elements (21), to each of which one linkage (24) is connected and a further linkage (24') is connectable in a direction opposing said one linkage (24) and perpendicular to the longitudinal direction, in which each linkage (24,24') forms part of an electrical connection between one of the power switches (4) and one of the busbar disconnecters (3,3') wherein the n busbars (14,14') extend along one of the walls of the busbar compartment (13,13') which are perpendicular to the front.

2. Switch gear according to claim 1, wherein the linkages (24,24') are detachable from the coupling element (21).

3. Switch gear according to claim 2, wherein the connections between the power switch (4) and the feed conductor (6) and the connections between the linkages (24,24') and the coupling elements (21) are constructed as sliding contacts.

4. Switch gear according to claim 1, wherein said switch gear is provided with two said busbar compartments (13, 13'), 2.n said busbar disconnecters (3,3') and 2.n said linkages (24,24') for the at least one group of n power switches (4), wherein the two busbar compartments (13,13') are located on either side of said one group of power switches (4) and the 2.n linkages (24,24') are connected to the coupling elements (21) associated with the power switches (4).

5. Switch gear according to claim 1, wherein said switch gear is provided with two said busbar compartments (13, 13'), 2.n said busbar disconnecters (3,3'), n said linkages (24') and n additional linkages (23) for the at least one group of n power switches (4), wherein the two busbar compartments (13,13') are located on either side of the said one group of power switches (4) and the n linkages (24') are connected to the coupling elements (21) associated with the power switches (4), the n additional linkages (23) are connected to the input connections of the power switches (4) and the busbar disconnecters (3) associated with one of the busbar compartments (13) are equipped such that they are able to make contact with the additional linkages (23).

6. Switch gear according to claim 1, wherein each of the busbar disconnecters (3,3') is constructed as a disconnecter with dual make-and-break elements (16,17).

7. Switch gear according to claim 1, wherein the busbar disconnecters (3,3') are provided with drive shafts (15,15'), which extend in the longitudinal direction perpendicular to the front of the switch gear (10), wherein operating mechanisms for the power switches (4) and the busbar disconnecters (3,3') are provided on the front of the switch gear.

8. Switch gear according to claim 1, wherein said switch gear is provided with one of $SF_6$ gas insulation and air insulation.

9. Switch gear according to claim 1, wherein said switch gear is provided with $SF_6$ gas insulation, in that n=3 and in that in the at least one group of three power switches (4), viewed in the said longitudinal direction, the three power switches (4) are arranged in a form of a triangle.

10. Switch gear according to claim 1, wherein on the back of the switch gear (10), a voltage transformer (7) is connected to the input connections of the at least one group of n power switches (4) for measurement purposes.

11. Switch gear according to claim 1, wherein the switch gear (10) further comprises a ground contact (26) located on the front, which is arranged to ground the switch gear (10) at the location of the linkages (24,24') between the power switch (4) and the busbar disconnecter (3,3'), the linkages (24,24') being provided with ground capture contacts (27).

* * * * *